April 22, 1958  W. J. CAGLE  2,831,569
GLASS TANK LOG PUSHER
Filed Feb. 24, 1956

INVENTOR.
WILLIAM J. CAGLE
BY
Oscar H. Spencer
ATTORNEY

United States Patent Office 2,831,569
Patented Apr. 22, 1958

2,831,569

GLASS TANK LOG PUSHER

William J. Cagle, Ford City, Pa., assignor to Pittsburgh Plate Glass Company, Allegheny County, Pa., a corporation of Pennsylvania Application February 24, 1956, Serial No. 567,515

7 Claims. (Cl. 198—224)

This invention relates to a glass tank log pusher, i. e., a device for pushing logs of glass batch or feed material floating on molten glass at the feed end of a glass manufacturing furnace.

In the manufacture of glass in a continuous ribbon, such as in the manufacture of a continuous ribbon of plate glass, the glass is manufactured in a large tank by feeding a mixture of the ingredients to be reacted and melted at one end of the tank. The level in the tank of the molten glass that results from the reaction is maintained by feeding batches of mixtures of materials to be reacted. Batch feeders are used to supply the mixture intermittently. Such feeders provide at each interval a volume of batch that has the appearance of a log. For example, such a volume will have a dimension of about 20 feet long and 10 inches wide and 10 inches high. Each of the batches fed at the end of the tank floats initially as an unmelted batch. A number of these batch charges can be seen near the feeding end of the glass tank as a series of logs floating on the molten reaction product. In order to prevent corrosive attack by the batch on the side walls of the tank it is necessary to prevent the logs from floating toward the side walls as they float downstream on the molten glass while being heated to be converted to the molten product.

In the practice heretofore used the logs of batch charge were prevented from floating toward and against the side walls of the tank by means of manual operation of a pushing tool. The tool comprised a rod having at one end a handle and having at the other end a plate substantially normal to the longitudinal axis of the bar. This pushing tool with the bar resting on a horizontal support rod was pushed by an operator into the tank with the change of direction as necessary until the front plate would engage a log floating on the molten product. The operator would move and direct the pushing tool to push the log away from the vicinity of the side wall of the tank. Of course, such a tool is required at the feed end adjacent to each of the two sides of the tank to insure that all of the logs will not contact the side walls of the tank.

With the increased rates of production of a continuous ribbon of glass it has been necessary to feed the batch material at a substantially increased rate. As a result the rate of feeding logs to the tank has increased considerably. Pushing the logs away from the side walls requires considerable energy. With increased production rates the number of times the pushing tool was required greatly increased. It became necessary to push two or more logs away from the wall in a given operation of the pushing tools. The total weight of the material to be pushed became so great that in some cases two operators were required to push the tool to move the logs away from the side walls. In some cases two operators were unable to push all of the logs away from the side walls. The latter condition required reduction of the rate of feeding the batch of material to decrease the rate of the flowing of the logs toward the side walls. The net result was to limit the rate of production of the continuous ribbon of glass.

It is an object of this invention to provide a glass tank log pusher that eliminates the need for a pushing force by an operator and merely requires a slight directing force to be imparted by an operator.

It is another object of this invention to provide a glass tank log pusher that can move two or more logs of glass batch material at one time.

Still a further object of the present invention is to provide a glass tank log pusher that will permit increased production of continuous ribbon of glass without increasing contact of the logs of batch material with the side walls of the tank.

These and other objects of the present invention will be apparent to one skilled in the art from the description of the preferred embodiment of the invention which follows, especially when taken in conjunction with the drawing in which.

Figure 1:
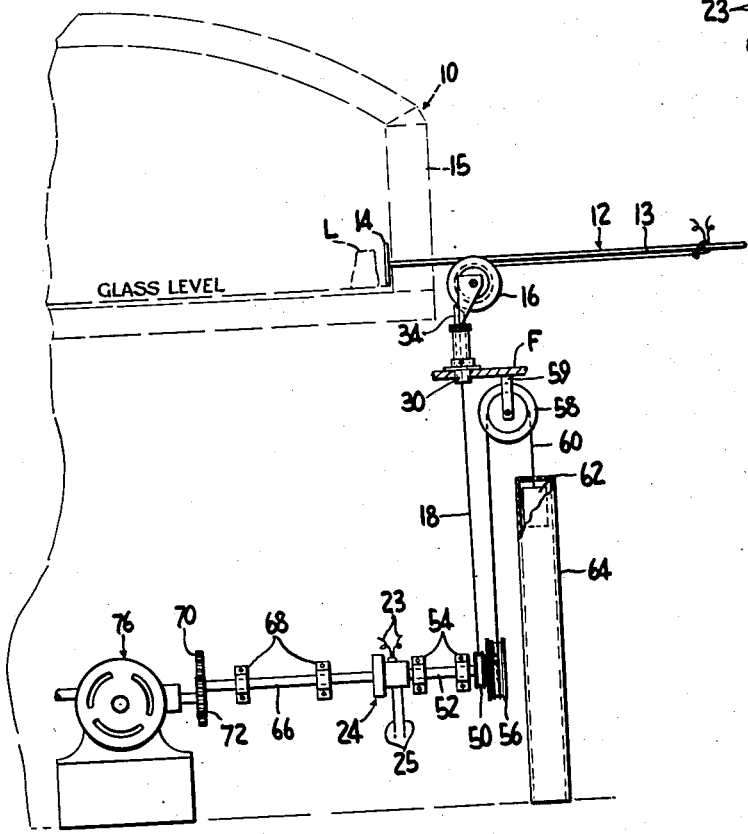
Fig. 1 is a fragmentary end elevation, partially schematic, of a glass tank furnace and the log pusher of the present invention.
Figure 4:
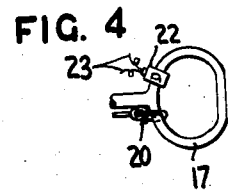
Fig. 4 is an enlarged top plan fragmentary view showing the manner of connecting the cable to the handle of the tool of Fig. 1 and also showing the switch for engaging a magnetic clutch also shown in Fig. 1.
Figure 2:
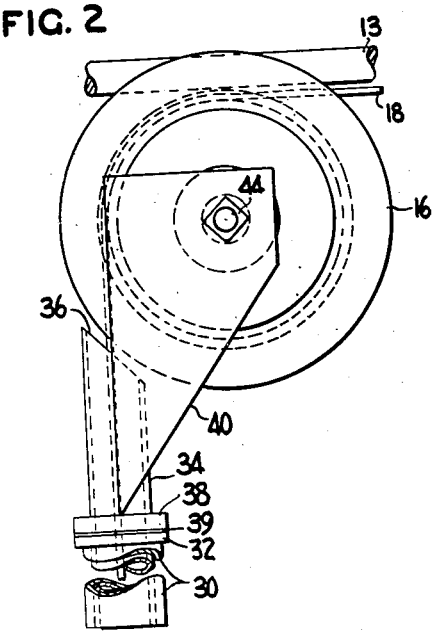
Fig. 2 is an enlarged fragmentary elevation of the bar of the pushing tool, the cable and the swivel pulley of the invention.
Figure 3:
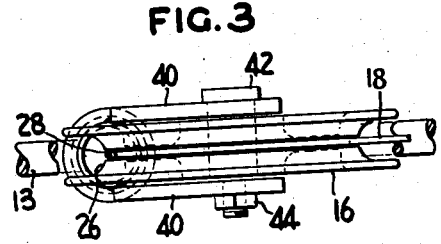
Fig. 3 is a top plan of the fragmentary view shown in Fig. 2.

The preferred embodiment of the glass tank log pusher of the present invention is shown in Fig. 1 along with a glass tank furnace generally indicated at 10. The furnace 10 is shown schematically and the view is from the feed end. A pushing tool is generally indicated at 12. The feed end of the glass furnace is provided with two holes (not shown) near the corners of the furnace 10 and one pushing tool 12 is utilized for each corner. In the fragmentary view of Fig. 1, of course, only one pushing tool 12 is shown and it is to be understood that a similar tool can be used at the feed end of the furnace near the other corner of the tank.

The tool 12 has a rod 13. At one end of the rod is mounted a plate or blade 14. Preferably plate 14 is mounted to rod 13 so that its plane is substantially normal to the longitudinal axis of rod 13. By moving tool 12 into the furnace 10 it can be moved so that plate 14 engages a log L of batch material to push it downstream and away from a side wall 15 of furnace 10. The tool 12 is supported on a pulley 16. The height of pulley 16 is preferably a height sufficient to support rod 13 so that, when rod 13 is in a horizontal position, the bottom of plate 14 is approximately at the level of the glass mixture in the furnace 10.

The other end of rod 13 is provided with a handle 17. A cable 18 is connected to handle 17 by means of a forked hook 20. A switch 22 is mounted on handle 17 and is preferably a conventional push button type. A pair of wires 23 is connected to switch 22 and to a magnetic clutch generally indicated at 24. A pair of wires 25 connects clutch 24 to a power source (not shown).

The pulley 16 is provided with an annular groove 26 and within the surface of groove 26 there is a second annular groove 28. For the reason presented below grooves 26 and 28 are preferably coplanar, i. e., their planes of symmetry are in the same plane, as shown in the preferred embodiment in the drawing.

In the conventional plant for the manufacture of plate or window glass utilizing the glass tank furnace 10 to supply molten glass for forming a continuous ribbon, there is a floor F somewhat below the level of the glass in the furnace 10. This floor is usually above the ground level. Below the floor there is space for conventional equipment including checkerbrick equipment of a regenerative gas furnace and supporting piers for the glass tank furnace 10.

A tube 30 is mounted on floor F and extends through an opening in floor F. The top end of tube 30 has a flange 32. A tube 34 is mounted within tube 30 and has its top end 36 cut at an oblique angle. The tube 34 has a rib 38 that rests on a bushing 39 on flange 32. Plates 40 are mounted to tube 34 above rib 38. A shoulder bolt 42 and a nut 44 are used to mount pulley 16 between plates 40 to rotate it about a horizontal axis. By this arrangement tube 34 can be rotated within tube 30 about a vertical axis so that pulley 16 is moved about this vertical axis.

Cable 18 extends from hook 20 to pulley 16 and is supported in groove 28. The configuration and dimensions of grooves 26 and 28 in the preferred embodiment, as well as the dimension of cable 18, are chosen so that when rod 13 is in groove 26 it will not contact cable 18 in groove 28. In view of the alignment of cable 18 in groove 28 and the alignment of rod 13 in groove 26 it is seen that cable 18 is underneath rod 13 most of the distance between pulley 16 and forked hook 20 even though the latter, when it is connected to handle 17, is slightly off center of the longitudinal axis of rod 13.

The cable 18 extends downwardly from pulley 16 and through tubes 34 and 30. The pulley 16 is mounted between plates 40 to rotate about a horizontal axis so that the downward extension of cable 18 from groove 28 is coaxial with the vertical axis of rotation of tube 34. This arrangement reduces substantially the jumping and twisting of cable 18 during the moving of pulley 16 by rotation of tube 34.

A pulley 50 is mounted on a shaft 52 rotatably mounted by means of pillow blocks 54 to a supporting structure (not shown). A pulley 56 is also mounted on shaft 52. A pulley 58 is rotatably mounted to brackets 59 hung from floor F. A cable 60 is connected to and wound around pulley 56 and over pulley 58. The other end of cable 60 is connected to a counterweight 62 positioned within a protective pipe 64. Viewing shaft 52 from the right in Fig. 1, cable 60 is wound counterclockwise around pulley 56. Cable 18 is connected to pulley 50 so that it will be wound clockwise around pulley 50 when shaft 52 rotates clockwise by engagement of magnetic clutch 24 and cable 60 will unwind from pulley 56 permitting downward movement of counterweight 62.

A shaft 66 is rotatably supported by pillow blocks 68 to a supporting structure (not shown). A gear 70 on shaft 66 engages a gear 72 on a shaft 74 of a motor and speed reducer combination generally indicated at 76.

*Operation*

When the operator sees a log or group of logs moving toward side wall 15 of furnace 10, the operator lifts up the handle 17 from floor F and moves tool 12 through the opening at the end of furnace 10. This motion is carried out manually until plate 14 of tool 12 engages a log L. Then the operator presses switch 22 to engage clutch 24. Motor 76 is already operating on a continuous basis so that shaft 66 is rotating. Wires 23 and wires 25 provide a circuit with switch 22 and clutch 24 in series. Engagement of clutch 24 by pressing switch 22 starts rotation of shaft 52 and pulley 50 thereby winding cable 18 on pulley 50 in a clockwise direction as viewed from the right of Fig. 1. This pulls cable 18 over pulley 16 thereby moving pushing tool 12 from right to left as viewed in Fig. 1. Of course, because pulley 16 can swivel in view of its mounting by means of tubes 30 and 34 and plates 42, it is understood that various motions in a horizontal plane can be given to tool 12 as it is moved in furnace 10 by winding of cable 18 on pulley 50. Likewise, in view of the fact that tool 12 is in groove 26 of pulley 16 the handle in 17 of tool 12 can be raised or lowered for best engagement of log L and for maintenance of said engagement during pushing of log L away from side wall 15 of furnace 10.

As cable 18 is wound on pulley 50 by rotation of shaft 52 the movement of cable 18 in groove 28 imparts a pulling force on tool 12 that is substantially coplanar with the movement of tool 12 in groove 26 resulting from said force. This structure produces the maximum use of the force created by the winding of cable 18 on pulley 50.

When the operator is manually moving tool 12 into furnace 10 cable 18 is prevented from becoming slack by means of the counterweight 62, cable 60 and pulleys 56 and 58. In other words, counterweight 62 will drop in tube 64 when rotation of shaft 52 is not prevented thereby unwinding cable 60 from pulley 56 and rotating shaft 52 and pulley 50 to wind cable 18 on pulley 50. This will keep cable 18 in a taut condition as tool 12 is moved manually into furnace 10. By maintaining cable 18 in a taut condition in this manner, backlashing of cable 18 is prevented when clutch 24 is engaged to mechanically move tool 12 further into furnace 10 to push a log L away from side wall 15.

Similarly, when the log or logs L have been pushed far enough away from the side walls of furnace 10 the operator opens switch 22 (in the case of a single button switch by merely removing his finger from the button) to disengage clutch 24. Then tool 12 is pulled manually out of furnace 10. When tool 12 is thus pulled out, cable 18 is maintained in taut condition because the rotation of pulley 50 by pulling on handle 17 of tool 12 works against and raises counterweight 62.

The foregoing description of the preferred embodiment of the pusher of the present invention has been described for purposes of illustration and not by way of limitation. There are numerous changes that could be made and are obvious to one skilled in the art. For example, cable 18 can have attached thereto a plate that would trip a limit switch to open the circuit containing the switch 22 and clutch 24. This arrangement would limit the inward movement of tool 12 thus serve as a safety factor. Also it is obvious that a motor means could be used without a magnetic clutch. In this case the switch on handle 17 would merely close a circuit momentarily to energize the coil of the starter for the motor. Energization of the coil closes the three contacts of the 3-phase line to the motor and a contact of a holding circuit for the coil of the motor starter. The electrical circuit for such a system is conventional. Of course, in such a case it would be necessary to provide some means for opening the holding circuit either manually or automatically by tripping a limit switch (in series in the holding circuit) in a manner indicated above.

I claim:

1. A glass tank log pusher comprising a rod, a plate attached to one end of the rod, a pulley support rotatably mounted about a vertical axis, a pulley rotatably mounted to the support about a horizontal axis, said pulley having a first annular groove and a second annular groove in the rim of the pulley, the bar being supported in the first groove of the pulley, a cable connected to the other end of the rod, engaging the second groove of the pulley and extending downwardly from the pulley, and motor means connected to the downward extension of the cable for pulling the cable across the pulley.

2. The pusher of claim 1 wherein the pulley is mounted to the pulley support to provide the downward extension of the cable substantially coaxial with the vertical axis of rotation of the pulley support.

3. A glass tank log pusher comprising a rod, a plate attached to one end of the rod, a pulley support rotatably mounted about a vertical axis, a pulley rotatably mounted to the support about a horizontal axis, said pulley having a first annular groove and a second annular groove in the rim of the pulley, said grooves being coplanar, the bar being supported in the first groove of the pulley, a cable connected to the other end of the rod, engaging the second groove of the pulley below the bar in the first groove and extending downwardly from the pulley, and motor means connected to the downward extension of the cable for pulling the cable across the pulley.

4. The pusher of claim 3 wherein the pulley is mounted to the pulley support to provide the downward extension of the cable substantially coaxial with the vertical axis of rotation of the pulley support.

5. A glass tank log pusher comprising a rod, a plate attached to one end of the rod, a first vertical tube having a flange at the top end, a second vertical tube above and extending into the first tube and having an annular rib supported by said flange, said second tube being rotatably mounted in the first tube about its longitudinal axis, a pair of plates mounted to the second tube, a pulley rotatably mounted to the plates about a horizontal axis, said pulley having a first annular groove and a second annular groove in the rim of the pulley, said grooves being coplanar, the bar being supported in the first groove of the pulley, a cable connected to the other end of the rod, engaging the second groove of the pulley below the rod and extending downwardly through said tubes, and motor means connected to the downward extension of the cable for pulling the cable across the pulley.

6. The pusher of claim 5 wherein the motor means includes a shaft rotatably mounted, a second pulley mounted on the shaft, the end of the cable being connected to the second pulley, a magnetic clutch connected to the shaft, a motor operatively connected to the clutch, and means including a switch mounted on the rod for engaging the magnetic clutch whereby the cable is pulled over the first pulley and wound around the second pulley.

7. The pusher of claim 6 wherein the pulley is mounted to said plates to provide the downward extension of the cable substantially coaxial with the vertical axis of rotation of said second tube.

References Cited in the file of this patent

UNITED STATES PATENTS

| | | |
|---|---|---|
| 491,768 | Chatfield | Feb. 14, 1893 |
| 1,614,393 | Robinson | Jan. 11, 1927 |
| 1,856,907 | Chapman | May 3, 1932 |